United States Patent
Noda

(10) Patent No.: US 9,478,818 B2
(45) Date of Patent: Oct. 25, 2016

(54) GAS DIFFUSION LAYER AND MEMBRANE ELECTRODE ASSEMBLY INCLUDING GAS DIFFUSION LAYER, AND METHOD OF REGENERATING MEMBRANE ELECTRODE ASSEMBLY

(71) Applicant: 3M INNOVATIVE PROPERTIES COMPANY, St. Paul, MN (US)

(72) Inventor: Kazuki Noda, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 29 days.

(21) Appl. No.: 14/381,751

(22) PCT Filed: Feb. 28, 2013

(86) PCT No.: PCT/US2013/028185
§ 371 (c)(1),
(2) Date: Aug. 28, 2014

(87) PCT Pub. No.: WO2013/130722
PCT Pub. Date: Sep. 6, 2013

(65) Prior Publication Data
US 2015/0024293 A1    Jan. 22, 2015

(30) Foreign Application Priority Data

Mar. 2, 2012    (JP) ................ 2012-046651

(51) Int. Cl.
*H01M 8/10*    (2016.01)
*H01M 4/86*    (2006.01)
(Continued)

(52) U.S. Cl.
CPC ......... *H01M 8/1002* (2013.01); *H01M 4/8663* (2013.01); *H01M 4/88* (2013.01); *H01M 4/9075* (2013.01); *H01M 8/04276* (2013.01); *H01M 8/1004* (2013.01); *H01M 4/926* (2013.01); *H01M 8/1067* (2013.01); *H01M 2008/1095* (2013.01); *H01M 2300/0082* (2013.01); *Y02E 60/521* (2013.01)

(58) Field of Classification Search
None
See application file for complete search history.

(56) References Cited

U.S. PATENT DOCUMENTS 5,338,430 A    8/1994    Parsonage
5,879,827 A    3/1999    Debe
(Continued)

FOREIGN PATENT DOCUMENTS

JP    2002-198059    7/2002
JP    2006-185845    7/2006
(Continued)

OTHER PUBLICATIONS

J-PlatPat Machine Translation of the detailed description of JP 2007-012506A (Jan. 2007).*
(Continued)

*Primary Examiner* — Gregg Cantelmo
(74) *Attorney, Agent, or Firm* — Julie Lapos-Kuchar; Gregory D. Allen

(57) ABSTRACT

Membrane electrode assembly is provided that includes an electrolyte membrane; an electrode catalytic layer including nanostructured elements having acicular micro structured support whiskers bearing acicular nanoscopic catalyst particles; and a gas diffusion layer including a nitrogen-containing compound that includes an anionic ion-exchange group. A method of regenerating the membrane electrode assembly is also provided.

15 Claims, 7 Drawing Sheets

(51) Int. Cl.
*H01M 4/88* (2006.01)
*H01M 4/90* (2006.01)
*H01M 8/04* (2016.01)
*H01M 4/92* (2006.01)

(56) References Cited

U.S. PATENT DOCUMENTS

| | | | |
|---|---|---|---|
| 5,879,828 | A | 3/1999 | Debe |
| 6,040,077 | A | 3/2000 | Debe |
| 6,319,293 | B1 | 11/2001 | Debe |
| 2002/0001744 | A1* | 1/2002 | Tsusaka .............. C08J 5/2256 429/481 |
| 2002/0004453 | A1 | 1/2002 | Haugen |
| 2005/0214632 | A1 | 9/2005 | Kida |
| 2007/0037040 | A1* | 2/2007 | Koyama ............ H01M 8/0245 429/483 |
| 2007/0082256 | A1 | 4/2007 | Debe |
| 2007/0082814 | A1 | 4/2007 | Debe |
| 2008/0193765 | A1* | 8/2008 | Ogawa ................ B01J 23/40 428/403 |

FOREIGN PATENT DOCUMENTS

| | | |
|---|---|---|
| JP | 2007012506 A * | 1/2007 |
| JP | 2007188788 A * | 7/2007 |
| JP | 2008-177132 | 7/2008 |
| JP | 2009-043430 | 2/2009 |
| JP | 2009-295441 | 12/2009 |
| JP | 2011-065838 | 3/2011 |
| WO | WO 99/019928 | 4/1999 |
| WO | WO 01/011704 | 2/2001 |
| WO | WO 2007/047088 | 4/2007 |
| WO | WO 2007/047262 | 4/2007 |
| WO | WO 2009/148114 | 12/2009 |
| WO | WO 2009/154305 | 12/2009 |

OTHER PUBLICATIONS

J-PlatPat Machine Translation of the detailed description of JP 2007-188788A (Jul. 2007).*
Chow, G.M., et alk. "Fabrication of biologically based microstructure composites for vacuum field emission", *Materials Science and Engineering*, A158 (1992), pp. 1-6.
Kam, K.K., et al., "Summary Abstract: Dramatic variation of the physical microstructure of a vapor deposited organic thin film", *J. Vac. Sci. Technol. A*, 5(4), Jul./Aug. 1987, pp. 1914-1916.
Morrison and Boyd, "Heterocyclic Compounds", *Organic Chemistry*, Third Edition, Allyn and Bacon, Inc. (Boston: 1974), Chapter 31, pp. 1002-1026.
International Search Report for PCT International Application No. PCT/US2013/028185, mailed on Jul. 2, 2013, 4pgs.

* cited by examiner

GAS DIFFUSION LAYER AND MEMBRANE ELECTRODE ASSEMBLY INCLUDING GAS DIFFUSION LAYER, AND METHOD OF REGENERATING MEMBRANE ELECTRODE ASSEMBLY

CROSS REFERENCE TO RELATED APPLICATIONS

This application is a national stage filing under 35 U.S.C. 371 of PCT/US2013/028185, filed Feb. 28, 2013, which claims priority to Japanese Patent Application No. 2012-046651 filed Mar. 2, 2012, the disclosures of which are incorporated by reference in their entirety herein.

FIELD OF INVENTION

This invention relates to a gas diffusion layer (GDL) that can be used as a constituent part of a membrane electrode assembly (MEA) for a fuel cell, a membrane electrode assembly that includes this gas diffusion layer, and a method of regenerating a membrane electrode assembly.

BACKGROUND

A Pt catalyst or Pt alloy catalyst supported on an electrically conductive material is commonly used as an electrode for polymer electrolyte fuel cells (PEFC). Carbon black having a large surface area is the most widely used electrically conductive material for supporting the catalyst. However, carbon supports corrode as a result of operation over a long period of time and repeated operation/stopping cycles. When the carbon support corrodes, agglomeration or solution of the Pt occurs, and as a result the activation of the catalyst may be reduced. Also, if positive ions and negative ions contained in the moisture in the air used as an oxidizing agent or the water used to maintain the MEA in a wet state, and so on, penetrate into the fuel cell, there is a reduction in the ion exchange of the sulfonate group in the polymer electrolyte membrane and a reduction in the activation of the catalyst, and so on, so the performance of the fuel cell is reduced.

Japanese Unexamined Patent Application Publication No. 2002-198059, published on Jul. 12, 2002, reports a polymer electrolyte fuel cell that includes a polymer electrolyte membrane; an anode and cathode that sandwich the polymer electrolyte membrane; an anode-side electrically conductive separator plate having a gas flow path that supplies fuel gas to the anode; and a cathode-side electrically conductive separator plate having a gas flow path that supplies oxidizing agent gas to the cathode, wherein the anode and cathode include a gas diffusion layer and a catalyst layer, and the gas diffusion layer includes an ion catcher.

Japanese Unexamined Patent Application Publication No. 2006-185845, published on Jul. 13, 2006, reports a gas diffusion layer for a fuel cell that includes a gas diffusion base material layer and a carbon layer, wherein the gas diffusion base material layer and/or the carbon layer includes a heavy metal ion arresting agent.

Japanese Unexamined Patent Application Publication No. 2008-177132, published on Jul. 31, 2008, reports a fuel cell provided with an anion arresting layer that includes a material that produces sparingly soluble salt by reaction with anions in the flow paths through which the fuel gas or the oxidizing agent gas flows.

Japanese Unexamined Patent Application Publication No. 2009-043430, published on Feb. 26, 2009, reports a membrane electrode assembly that includes a polymer electrolyte membrane and a pair of electrodes that sandwich the polymer electrolyte membrane, wherein an intermediate layer is provided between the polymer electrolyte membrane and at least one of the electrodes, the intermediate layer includes an ion conductive material, and has acid amide bonds at the interface with the polymer electrolyte membrane and the electrode.

SUMMARY

U.S. Pat. Appl. Pub. Nos. 2007/0082256 (Debe et al.) and 2007/0082814 (Debe et al.), the disclosures of which are incorporated herein by reference, report acicular microstructured whiskers supporting acicular nanoscopic catalyst particles. These patent documents also report an electrode catalytic layer formed by directly embedding such nanostructured elements containing the whiskers into polymer electrolyte membrane (PEM).

This catalyst is referred to as nanoscale thin film (NSTF) catalyst, and it not only exhibits a relatively high catalytic activity with a relatively small quantity of catalytic material due to the shape thereof, but also it provides a method of substantially solving the problem of corrosion of the carbon support.

However, applicants have discovered that compared with other commonly used conventional catalysts, NSTF catalyst is more easily affected by catalytic contaminants or poisons. Applicants in looking at the effect of various contaminants contained in external water, found that chloride ions reduce the catalytic activity of NSTF catalysts during operation of fuel cells. Chloride ions are commonly present in the environment, such as in tap water, and are one possible pollutant in water introduced into fuel cells. On the other hand, chloride ion does not reduce the catalytic activity of conventional catalysts, which have a catalytic surface area larger than that of NSTF catalysts. In other words, although not limited to NSTF catalysts, the characteristics of high efficiency catalysts such as NSTF catalysts, which exhibit sufficient catalytic activity with a small catalytic surface area, are significantly affected by relatively small quantities of contaminants or poisons.

Therefore, the problem exists to prevent or suppress the above phenomenon discovered by Applicants, namely the reduction in catalytic activity due to chloride ions.

In one aspect the present disclosure provides a membrane electrode assembly that includes an electrolyte membrane; an electrode catalytic layer including nanostructured elements having acicular microstructured support whiskers bearing acicular nanoscopic catalyst particles; and a gas diffusion layer including a nitrogen-containing compound that includes an anionic ion-exchange group.

In another aspect, the present disclosure provides a gas diffusion layer including a nitrogen-containing compound having an anionic ion-exchange group, wherein the nitrogen-containing compound is crosslinked, thereby being immobilized to the gas diffusion layer.

In another aspect the present disclosure provides a method of regenerating a membrane electrode assembly, the membrane electrode assembly including: an electrolyte membrane; an electrode catalytic layer including nanostructured elements having acicular microstructured support whiskers bearing acicular nanoscopic catalyst particles; and a gas diffusion layer including a nitrogen-containing compound having an anionic ion-exchange group, the method including contacting the gas diffusion layer with an alkaline solution.

According to this disclosure, the anionic ion-exchange group of the nitrogen-containing compound included in the gas diffusion layer can arrest chloride ions, so it is possible to reduce the reduction in catalytic activity due to chloride ions contained in moisture in the air or in the water for wetting the membrane electrode assembly. In particular, it is possible to effectively reduce the reduction in catalytic activity due to chloride ion contamination in high efficiency catalysts such as NSTF catalysts.

According to another embodiment of this disclosure, it is possible to regenerate a membrane electrode assembly without dismantling it by bringing an alkaline solution into contact with the gas diffusion layer, and discharging to the outside the chloride ions arrested on the anionic ion-exchange group of the nitrogen-containing compound included in the gas diffusion layer.

Note that the above descriptions should not be construed to be a disclosure of all of the embodiments and benefits of the present invention.

DETAILED DESCRIPTION

A detailed explanation for the purpose of illustrating representative embodiments of the present invention is given below, but these embodiments should not be construed to limit the present invention.

In this disclosure, "nanostructured element" means an acicular discrete microscopic structure that includes catalytic material in at least a part of the surface. "Microstructure" means a discrete microscopic structure. "Microscopic" means having a dimension in at least one direction equal to or smaller than about a micrometer. "Discrete" refers to distinct elements, having a separate identity, but does not preclude elements from being in contact with one another. "Nanoscopic catalyst particle" means a particle of catalytic material having a dimension in at least one direction of not more than about 15 nm or a crystallite size of not more than about 15 nm, as measured from diffraction peak half widths of standard 2-theta x-ray diffraction scans. "Acicular" means having a height not less than three times the average width in cross-section.

Figure 1:
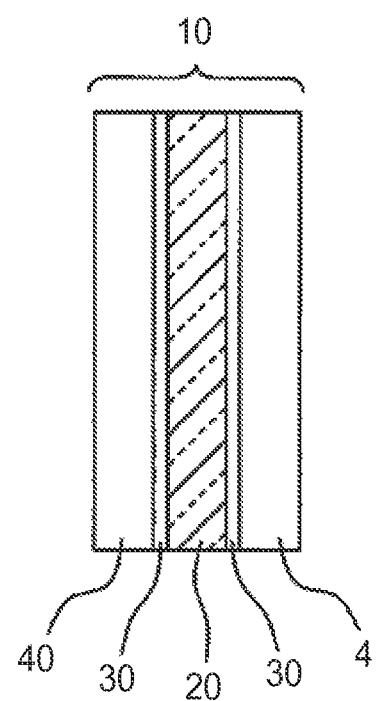
FIG. 1 is a cross sectional view of a membrane electrode assembly according to an aspect of the present disclosure.

FIG. 1 is a cross-sectional view illustrating a membrane electrode assembly (MEA) according to an embodiment of the present disclosure. A membrane electrode assembly 10 includes an electrolyte membrane 20, an electrode catalytic layer 30, and a gas diffusion layer 40. The electrode catalytic layer 30 includes a nanostructured element that includes acicular microstructured support whiskers that support acicular nanoscopic catalyst particles. The gas diffusion layer 40 includes a nitrogen-containing compound that includes an anionic ion-exchange group. In FIG. 1, a membrane electrode assembly with a 5-layer structure in which the electrolyte membrane 20 is disposed sandwiched between two electrode catalytic layers 30, and gas diffusion layers 40 are disposed sandwiching the two electrode catalytic layers 30, but one of the electrode catalytic layers may be an electrode catalytic layer that is different from an electrode catalytic layer that includes a nanostructured element that includes acicular microstructured support whiskers that support acicular nanoscopic catalyst particles, for example it may be a Pt catalyst or Pt alloy catalyst supported on an electrically conductive material such as carbon black, and one of the gas diffusion layers may be a conventional gas diffusion layer.

The electrolyte membrane 20 may be a conventionally known organic electrolyte membrane or an inorganic electrolyte membrane. For example, a conventionally known polymer electrolyte membrane that includes ion conductive polymer can be used as the electrolyte membrane. A useful ion conductive polymer in this disclosure can include an anionic functional group such as a sulfonate group, a carbonate group, or a phosphonate group bonded to a polymer backbone, of which preferably a sulfonate group is used. The ion conductive polymer can include an imide group, and amide group, or another acidic functional group. Typically, the thickness of the electrolyte membrane is at least about 1 micrometer (in some embodiments. at least about 5 micrometer, or even at least about 10 micrometers). Typically, the thickness of the electrolyte membrane is not more than about 50 micrometers (in some embodiments, not more than about 40 micrometers, or even not more than about 30 micrometers). In some embodiments, the thickness of the electrolyte membrane is in a range from about 1 micrometer to 50 micrometers (in some embodiments, 10 micrometer to 30 micrometers).

An example of a useful ion conductive polymer is highly fluorinated, typically perfluorinated, fluorocarbon material. Such a fluorocarbon material can be a copolymer of tetrafluoroethylene and one or more types of fluorinated acidic functional co-monomers. Fluorocarbon resin has high chemical stability with respect to halogens, strong acids, and bases, so it can be beneficially used. For example, when high oxidation resistance or acid resistance is desirable in the cathode of a fuel cell, a fluorocarbon resin having a sulfonate group, a carbonate group, or a phosphonate group, and in particular a fluorocarbon resin having a sulfonate group can be beneficially used. Examples of fluorocarbon resin having a sulfonate group include resins available, for example, under the trade designation "DYNEON" from 3M Company, St. Paul, Minn.; "NAIFON" from DuPont Chemicals, Wilmington, Del.; "FLEMION" from Asahi Glass Co., Ltd., Tokyo, Japan; "ACIPLEX" from Asahi Kasei Chemicals, Tokyo, Japan; as well as those available from ElectroChem, Inc., Woburn, Mass. and Aldrich Chemical Co., Inc., Milwaukee, Wis.). Typically, the equivalent weight of sulfonate group in the ion conductive polymer is at least about 500, and not greater than about 1100.

The electrolyte membrane can be manufactured by an appropriate conventionally known method, using the ion conductive polymer as described above. For example, the electrolyte membrane can be formed by preparing a dispersion liquid of ion conductive polymer, for example an aqueous dispersion liquid, applying the dispersion liquid to the base material by bar coating, die coating, spraying, slit coating, and so on, and then drying. Or, the electrolyte membrane can be formed by melting the ion conductive polymer, for example by extrusion molding. The formed electrolyte membrane can be annealed typically at at least about 120° C. (in some embodiments, at least about 130° C., or even at least about 150° C.).

The structure and method of making the electrode catalytic layer that includes a nanostructured element that includes acicular microstructured support whiskers that support acicular nanoscopic catalyst particles are disclosed, for example, in U.S. Pat. No. 5,338,430 (Parsonage et al.), U.S. Pat. No. 5,879,827 (Debe et al.), U.S. Pat. No. 6,040,077 (Debe et al.), U.S. Pat. No. 6,319,293 (Debe et al.) and International Pat. Pub. No. WO 01/11704, published on 15 Feb. 2001, and U.S. Pat. Appl. Pub. No. 2002/0004453 (Haugen et al.).

For example, the electrode catalytic layer 30 that includes a nanostructured element that includes acicular microstructured support whiskers that support acicular nanoscopic catalyst particles can be manufactured as follows. First, a base member such as a polyimide film having a surface texture (available, for example, under the trade designation "KAPTON", from DuPont Electronics, Wilmington, Del.) is prepared. Then, a support material selected from polynuclear aromatic hydrocarbon and heteroaromatic compounds (see, e.g., Morrison and Boyd, Organic Chemistry, Third Edition, Allyn and Bacon, Inc. (Boston: 1974), Chapter 31) is deposited on the base member. For example, naphthalene, phenanthrene, perylene, anthracene, coronene, and pyrene, N,N'-di(3,5-xylyl)perylene-3,4:9,10-bis(dicarboxyimide) (available, for example, from American Hoechst Corp., Somerset, N.J., under the trade designation "C. I. PIGMENT RED 149", hereafter also referred to as "perylene red") can be used as a support material. Typically perylene red is used as a support material and it is deposited by vacuum deposition, sputtering, physical vapor deposition, chemical vapor deposition, and thermal sublimation (typically perylene red is deposited by thermal sublimation). For example, when forming uniformly oriented acicular microstructured support whiskers containing perylene red, preferably the temperature of the base member is in a range from about 0° C. to about 30° C. when depositing the perylene red. The thickness of the support material layer formed in this way is typically in a range from about 1 nm to about 1 micrometer, and preferably in a range from about 0.03 micrometer to about 0.5 micrometer.

Subsequently, the shape of the support material layer is physically changed by annealing the deposited support material under reduced pressure, and a plurality of acicular microstructured support whiskers is formed arranged in the form of a layer on the base member. The acicular microstructured support whiskers are normally oriented approximately uniformly in the direction normal to the surface of the base member. The orientation state can determined, for example, by the annealing temperature, pressure, and time, the type of support material, and the thickness of the support material layer. For example, when the support material layer is perylene red, the annealing temperature is in some embodiments in a range from about 160° C. to about 270° C., and the time is in a range from about 10 minutes to about 6 hours, under reduced pressure (less than about $1 \times 10^{-3}$ Torr). When the thickness of the perylene red support material layer is in a range from about 0.05 micrometer to, about 0.15 micrometer, in order to transform the perylene red into the acicular microstructured support whiskers without loss due to sublimation. In some embodiments the annealing temperature is in a range from about 245° C. to about 270° C.

The length and shape of the individual acicular microstructured support whiskers may be substantially the same or they may be different, but typically the average diameter of the whisker cross-section is substantially uniform. In this disclosure, "the average diameter of the whisker cross-section" is defined as the average value of the dimension of the lateral cross-section along the main axis of the whisker. In some embodiments, the average diameter of the whisker cross-section is not more than about 1 micrometer (in some embodiments, not more than about 100 nm). In some embodiments, the average diameter of the whisker cross-section is in a range from about 20 nm to about 100 nm. In some embodiments, the length of the whisker is not more than about 50 micrometers, where the whisker length is defined as the length along the whisker main axis (in some embodiments, the whisker length is in a range from about 0.1 micrometer to about 5 micrometers, and even more preferably in a range from about 0.1 micrometer to about 3 micrometers).

In some embodiments, the average aspect ratio of the acicular microstructured support whiskers at least about 3 micrometers (in some embodiments, at least about 4 micrometer, or even at least about 5 micrometers. Also, in some embodiments, the average aspect ratio is not more than about 100 micrometers (in some embodiments, not more than about 50 micrometers, or even not more than about 20 micrometers). In this disclosure, "average aspect ratio" is the value of the length of a whisker divided by the average diameter of the whisker cross-section as described above, averaged over a plurality of microstructured support whiskers. In some embodiments, the areal density of the acicular microstructure support whiskers is in a range from about 0.1 whisker/micrometer$^2$ to about 1000 whiskers/micrometer$^2$ (in some embodiments, in a range from about 1 whisker/micrometer$^2$ to about 100 whiskers/micrometer$^2$).

Next, electrically conductive catalyst material is deposited on the acicular microstructured support whiskers, for example, by vacuum deposition, sputtering, physical vapor deposition, or chemical vapor deposition. For the catalyst material, for example transition metals (e.g., Au, Ag, Pt, Os, Ir, Pd, Ru, Rh, Sc, V, Cr, Mn, Co, Ni, Cu, and Zr); low melting point metals (e.g., Bi, Pd, In, Sb, Sn, Zn, and Al); high melting point metals (e.g., W, Re, Ta, and Mo), and alloys or mixtures thereof, and in some embodiments Pt or a Pt alloy (e.g., an alloy of Pt and at least one metal selected from the group consisting of Co, Mn, and Ru) is used. The method of deposition of the catalyst material is disclosed in, for example, U.S. Pat. No. 5,338,430 (Parsonage et al.), U.S. Pat. No. 5,879,827 (Debe et al.), U.S. Pat. No. 5,879,828 (Debe et al.), U.S. Pat. No. 6,040,077 (Debe et al.), and U.S. Pat. No. 6,319,293 (Debe et al.), and U.S. Pat. Appl. Pub. No. 2002/0004453 (Haugen et al.). In this way, fine particles of catalyst material with a dimension of several nm, for example, about 2 nm to 10 nm, in a certain direction are formed on the surface of the acicular microstructured support whiskers, and the surface of the acicular microstructured support whiskers is covered at least in part with catalyst material. Typically, the thickness of the catalyst film is in a range from about 0.2 nm to about 50 nm, and preferably about 1 nm to about 20 nm. The catalyst material film may be in a plurality of disconnected areas on the surface of the same acicular microstructured support whisker. When the catalyst material is deposited so that it is incident in virtually the normal direction with respect to the surface of the base member that supports the acicular microstructured support whiskers, smaller nanoscale individual catalyst particles may grow on the side surfaces of the acicular microstructured support whiskers. The surface area of these catalyst particles which have a fractal-like structure approaches the theoretical maximum value, so it is possible to achieve high catalytic activity with less catalyst material.

In this way it is possible to form a catalyst coated membrane (CCM) that includes an electrolyte membrane and an electrode catalytic layer that includes a nanostructured element that includes these whiskers, by applying the acicular microstructured support whiskers that support acicularnanoscopic catalyst particles obtained in this way to the above electrolyte membrane. For example, the base member having on the surface thereof the acicular microstructured support whiskers that support the acicular nanoscopic catalyst particles can be disposed on top of the electrolyte membrane so that the whiskers face the surface of the electrolyte membrane, and by heating and applying pressure to the stack obtained using a laminator or the like, and then removing the base member, it is possible to transfer the whiskers from the base member to the electrolyte membrane, with the whiskers embedded in the electrolyte membrane.

The gas diffusion layer (GDL) according to this disclosure includes a nitrogen-containing compound that includes an anionic ion-exchange group. A functional group that is capable of arresting chloride ions by electrical interaction can be used as the anionic ion-exchange group. The gas diffusion layer according to this disclosure includes an anionic ion-exchange group on the surface, interior or surface and interior thereof, so the electrode catalytic layer disposed adjacent to and in contact with the gas diffusion layer is protected from contact with chloride ions that penetrate into the fuel cell together with moisture in the air, water that wets the membrane electrode assembly so it is possible to prevent or suppress the reduction of catalytic activity. This effect of reducing the catalytic activity reduction by arresting the chloride ions is effective for any catalyst, but in particular it is extremely effective for high efficiency catalysts having a small catalyst area, such as the nanostructured element as described above, for which contamination by a small quantity of chloride ion can easily affect the catalytic activity.

Any of a variety of materials which have gas permeability and conductivity can be used as the base member of the gas diffusion layer. A base member itself can be used as a gas diffusion layer or a base member having a coating layer on a surface of the base member can be used as a gas diffusion. The gas diffusion layer provides fine holes to bring gaseous reaction substances and water vapor into close contact with the electrode catalytic layer and the electrolyte membrane, and collects the current generated in the electrode catalytic layer and supplies electrical power to an external load. Carbon paper is generally used as the gas diffusion layer. A mesh, porous web or porous fabric made from an electrically conductive material (e.g., carbon or metal) can be used as the gas diffusion layer. A water repellant finish may be applied to the gas diffusion layer using a conventionally known method. The water repellant material used in the water repellant finish can be, for example, a fluorine resin (e.g., polytetrafluoroethylene (PTFE), polyvinylidene difluoride (PVDF), polyhexafluoropropylene, tetrafluoroethylene-hexafluoropropylene copolymer (FEP), or a polyolefin such as polyethylene, and polypropylene). One exemplary carbon paper thickness about 240 micrometer) for use as a gas diffusion layer is available, for example, under the trade designation "U105" from Mitsubishi Rayon Co., Ltd., Tokyo, Japan.

A nitrogen-containing compound having at least one functional group selected from the group consisting of the amino group, the amide group, the ammonium group, and combinations thereof, for example, can be used as the nitrogen-containing compound that includes an anionic ion-exchange group. The amino group and the amide group are anionic ion-exchange groups that electrically interact with chloride ions by protonation. The nitrogen-containing compound that has the anionic ion-exchange group may be a low molecular weight compound, or, for example, a polymer or copolymer obtained from one or more types of polymerizable monomer with a molecular weight of at least about 500.

The nitrogen-containing compound that has the anionic ion-exchange group can be applied to the gas diffusion layer, for example, by coating, impregnation, or spraying. The nitrogen-containing compound that has the anionic ion-exchange group can be applied dissolved or dispersed in a solvent (e.g., water); an aliphatic hydrocarbon (e.g., pentane, hexane, and heptanes); an aromatic hydrocarbon (e.g., benzene, toluene, and xylene); a halogenated hydrocarbon (e.g., dichloroethane); alcohols (e.g., methanol, ethanol, 1-propanol, 2-propanol, and hexafluoro-2-propanol); ethers (e.g., diethyl ether, 1,2-dimethoxyethane, tetrahydrofuran, and 1,4-dioxane); ketones (e.g., acetone, methyl ethyl ketone, and methyl isobutyl ketone; esters (e.g., acetic ether and ethyl propionate); amides (e.g., N,N-dimethylformamide); and sulfoxides (e.g., dimethyl sulfoxide). The concentration of the nitrogen-containing compound that has the anionic ion-exchange group in the solvent or dispersion liquid is typically in a range from about 0.001 mass % to about 20 mass %, (in some embodiments, in a range from about 0.1 mass %, to about 10 mass %). The solvent can be removed when necessary, for example, by air-drying or heating. A mixture of the nitrogen-containing compound that has the anionic ion-exchange group and an adhesive binder or the like can also be coated on the gas diffusion layer, and the whole surface of the gas diffusion layer may be coated, or the surface may be partially coated, thereby forming, for example, a predetermined pattern. A surface modification process, such as a corona process or a plasma process may be carried out in advance on the gas diffusion layer.

Nitrogen-containing alkoxysilane, hydrolyzed condensate thereof, and mixtures thereof can be used as the nitrogen-containing compound having the anionic ion-exchange group. Exemplary nitrogen-containing alkoxysilane can be selected from the group consisting of amino alkoxysilane, amide alkoxysilane, and alkoxysilyl ammonium salt. Amino alkoxysilane is preferred as it is easily obtained. Nitrogen-containing alkoxysilane having two or more, and in particular three or more, alkoxy groups within the molecule increase the adhesion to the gas diffusion layer, so are often preferred. Examples of nitrogen-containing alkoxysilane include amino alkoxysilane (e.g., 3-aminopropyl trimethoxysilane, 3-aminopropyl triethoxysilane, 3-aminopropyl methyl dimethoxysilane, 3-aminopropyl methyl diethoxysilane, 3-ureidopropyl triethoxysilane, N-(2-aminoethyl)-3-aminopropyl trimethoxysilane, and N-(2-aminoethyl)-3-aminopropyl triethoxysilane); amide alkoxysilane (e.g., N-(3-(trimethoxysilyl) propyl) acrylamide, N-(3-(trimethoxysilyl) propyl) methacrylamide, N-(3-(triethoxysilyl) propyl) acrylamide, and N-(3-(triethoxysilyl) propyl) methacrylamide); and alkoxysilyl ammonium salt (e.g., 3-(trimethoxysilyl) propyl dimethyl octadecyl ammonium chloride, and 3-(triethoxysilyl) propyl dimethyl octadecyl ammonium chloride. Preferred nitrogen-containing alkoxysilane include 3-aminopropyl trimethoxysilane, 3-aminopropyl triethoxysilane, 3-aminopropyl methyl dimethoxysilane, 3-aminopropyl methyl diethoxysilane, 3-ureidopropyl triethoxysilane, N-(2-aminoethyl)-3-aminopropyl trimethoxysilane, and N-(2-aminoethyl)-3-aminopropyl triethoxysilane; more preferably N-(2-aminoethyl)-3-aminopropyl trimethoxysilane, and N-(2-aminoethyl)-3-aminopropyl triethoxysilane. The nitrogen-containing alkoxysilane can form a hydrolyzed condensate in a protic solvent (e.g., water and alcohol), if necessary in the presence of an acidic catalyst or a basic catalyst. In this disclosure, this hydrolyzed condensate, or mixtures of nitrogen-containing alkoxysilane and hydrolyzed condensate can be used.

The solution obtained by dissolving the nitrogen-containing alkoxysilane in solvent (e.g., aliphatic alcohols with 1 to 4 carbons (e.g., methanol, ethanol, 1-propanol, 2-propanol, and 1-butanol); solvent mixtures of water/alcohol including water and aliphatic alcohols with 1 to 4 carbons; and acidic solvent mixtures of water/alcohol in which acid (e.g., acetic acid) is added to the solvent mixtures of water/alcohol, for example, can be applied to the gas diffusion layer. After applying such a solution to the gas diffusion layer, the solvent can be removed by, for example, heating if necessary. At this time the heating can also generate hydrolyzed condensate of the nitrogen-containing alkoxysilane on the gas diffusion layer.

Preferably, the nitrogen-containing compound having an anionic ion-exchange group is crosslinked thereby being immobilized to the gas diffusion layer. By immobilizing in this way, even when the fuel cell has been operated for a long period of time under very wet conditions, it is possible to retain most of the nitrogen-containing compound on the surface and/or the interior of the gas diffusion layer, and minimize as much as possible the reduction in the performance of arresting chloride ions on the gas diffusion layer. Preferably the nitrogen-containing compound having an anionic ion-exchange group has a functional group for crosslinking within the molecule. Initiation or promotion of crosslinking of the nitrogen-containing compound can be carried out by heating or UV irradiation, or the like. When heating is used, the temperature is kept below a specific temperature so that the anionic ion-exchange group does not excessively decompose.

For example, when there are two or more, and preferably 3 or more, alkoxy groups within the molecule, by hydrolyzed condensation of the nitrogen-containing alkoxysilane, it is possible to form crosslinking by intertwining the siloxane bond and the polymer chain. While not bound by theory, it is believed that by forming a network of the crosslinked nitrogen-containing alkoxysilane on the surface of the material that constitutes the gas diffusion layer (e.g., carbon fibers), and covering that surface, it is considered that the compound is more strongly immobilized to the gas diffusion layer. After applying polymerizable composition that includes nitrogen-containing acrylic monomer (e.g., ethyl 3-(dimethylamino)acrylate, acrylamide, and methacrylamide) to the gas diffusion layer, crosslinks can be formed by promoting the polymerization reaction by heating and/or irradiation with light.

If crosslinks are formed by promoting the polymerization reaction by heating, preferably it is carried out below the temperature at which the anionic ion-exchange group decomposes and loses function. If alkoxysilane containing an amino group is used as the anionic ion-exchange group, decomposition of the amino group can be minimized and the crosslinks formed, for example, by holding at 160° C. for 30 minutes.

A carbon layer may be formed on the gas diffusion layer. The carbon layer formed on the gas diffusion layer can be formed using a composition that includes carbon particles and water repellant agent. When a carbon layer is used, it is possible to discharge to the outside water in the electrode catalytic layer that is disposed adjacent to the gas diffusion layer in the fuel cell by using the capillary phenomenon. Therefore, preferably the carbon layer is formed on the surface of the gas diffusion layer in contact with the electrode catalytic layer.

Conventionally known carbon particles can be used as the carbon particles (e.g., carbon black, graphite, and expanded graphite) can be used. Carbon black (e.g., oil furnace black, channel black, lamp black, thermal black, and acetylene black) can be beneficially used, due to the excellent electronic conductivity and large specific surface area thereof. The particle diameter of the carbon particles is preferably in a range from about 10 nm to about 100 nm. The same water repellant agent as used in the above water repellant process of the gas diffusion layer can be used as the water repellant agent, and preferably fluorine resin is used for the excellent water repellancy, corrosion resistance.

The membrane electrode assembly according to this disclosure can be manufactured by methods that are known in this technical field. For example, as stated above, after forming the catalyst coated membrane (CCM) by applying the acicular microstructured support whiskers that support the acicular nanoscopic catalyst particles to the electrolyte membrane, the catalyst coated membrane is sandwiched by the gas diffusion layer, then by pressure bonding using, for example, a hot press, a roll press, or adhesive, if necessary, the membrane electrode assembly can be manufactured.

The membrane electrode assembly manufactured in this way can be incorporated into a polymer electrolyte fuel cell that can be used as the power source for a movable body (e.g., a vehicle) or as a fixed power source. The fuel cell may have any of a variety of configurations as is known in the art. Typically, the membrane electrode assembly according to this disclosure has a structure in which it is sandwiched between partition plates, and when necessary a sealing material (gasket). Any of a variety of materials known in the art, such as a material that includes carbon (e.g., precision carbon graphite, or carbon plate), a material that includes metal (e.g., stainless steel) can be used as the partition plates sandwiching the membrane electrode assembly. The partition plates may be electrically conductive. Fluid passages may be formed in the partition plates in order to distribute reaction substances such as air, hydrogen, or the like, or generated products. Any of a variety of materials having the function of sealing so that gas in the interior of the membrane electrode assembly does not leak may be used as the seal material. Exemplary sealing materials include a compressible material such as a silicone or fluoropolymer material. A strong sealing material made from these materials covering glass fiber or another strong material can be used.

The fuel cell may be used as a single cell that includes a single membrane electrode assembly, or a fuel cell stack may be formed in which a plurality of membrane electrode assemblies is connected in series and stacked with separators disposed there between, in order to obtain a higher voltage or output. The shape, layout, electrical connections, etc. can be determined as appropriate by a person skilled in the art to which this disclosure pertains, in order to obtain the desired cell characteristics (e.g., voltage).

The gas diffusion layer according to this disclosure can also be used in other electrode catalytic layers in which the performance can be reduced by chloride ions, for example, electrode catalytic layers that include Pt covered carbon black or Pt alloy covered carbon black. In particular, the gas diffusion layer according to this disclosure can be beneficially used in combination with catalysts that are easily affected by catalyst contaminants or poisons due to chloride ion, and that have small catalytic surface area.

Chloride ions that penetrate from the outside into the interior of the fuel cell are arrested by the anionic ion-exchange group. When a fuel cell has been used for a long period of time, the arrested chloride ions accumulate on the gas diffusion layer, and the performance of the gas diffusion layer in arresting chloride ions is gradually reduced. In this case, it is possible to restore the chloride ion arresting performance by bringing an alkaline solution (e.g., an aqueous solution of sodium hydroxide or an aqueous solution of sodium bicarbonate) into contact with the gas diffusion layer, extracting the arrested chloride ion in the alkaline solution, and discharging the alkaline solution to the outside. In this way it is possible to regenerate the membrane electrode assembly in-situ by injecting the alkaline solution into the fuel cell at a predetermined flow rate, without dismantling the membrane electrode assembly.

During regeneration of the membrane electrode assembly, when cations such as sodium ions and potassium ions reach the electrolyte membrane, ion exchange occurs with the sulfonate group of the electrolyte membrane, so the ion conductivity of the electrolyte membrane is reduced, and as a result, the output performance may be reduced. Therefore, the concentration and quantity of alkaline solution used for regenerating the membrane electrode assembly are controlled to be as low and small as possible, in order to extract most of the chloride ion arrested on the gas diffusion layer. For example, if the alkaline solution including the extracted chloride ion is analyzed by ion chromatography or the like, the concentration, quantity, injection time, frequency, and so on of the alkaline solution can be determined based on the analysis results. The concentration of the alkaline solution is typically in a range from about 0.05 mmol/L to about 1 mmol/L. After regeneration, deionized water is injected into the fuel cell and the residual alkaline components are discharged to the outside. In this way, it is possible to maintain the electrolyte membrane of the fuel cell and so on in a more appropriate state for operation.

WORKING EXAMPLES

Preparation of a Solution of Nitrogen-Containing Compound that Includes the Anionic Ion-Exchange Group 76 grams of 2-propanol and 19 grams of deionized water were placed in a beaker and agitated. Into this, 5 grams of N-(2-aminoethyl)-3-aminopropyl trimethoxylsilane (obtained under the trade designation "KBM-603" from Shin-etsu Chemical Co., Ltd., Tokyo, Japan) was titrated. During titration, agitation was carried out as fast as possible. In this way, the solution of nitrogen-containing compound containing the anionic ion-exchange group was prepared. The structure of the N-(2-aminoethyl)-3-aminopropyl trimethoxylsilane was:

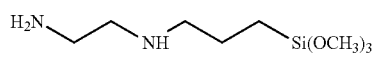

Formula 1

Manufacture of the Gas Diffusion Layer (GDL)

Carbon paper (obtained under the trade designation "U105" from Mitsubishi Rayon Co., Ltd., Tokyo, Japan) was immersed in an aqueous dispersion liquid of 5% by weight polytetrafluoroethylene (PTFE), and dried for 20 minutes at 100° C. Next, acetylene black (obtained under the trade designation "DENKA BLACK 50% PRESS" from Denki Kagaku Kogyo K.K, Tokyo, Japan)) was mixed into the aqueous dispersion liquid of 5% PTFE and dispersed to provide an ink for an electrically conductive water repellant layer (carbon layer). This ink was applied to the carbon paper to which the water repellant process was applied, using the doctor blade method, dried for 20 minutes at 100° C., and finally by baking for 3 minutes at 320° C., the carbon layer was formed on one side of the carbon paper.

Manufacture of the Gas Diffusion Layer (N-GDL) Including the Nitrogen-Containing Compound that Includes the Anionic Ion-Exchange Group 3 grams of the solution (prepared above) of nitrogen-containing compound that includes the anionic ion-exchange group was applied by spraying to the side of the GDL on which there was no carbon layer, and was maintained for 30 minutes at 160° C. Next, the aqueous dispersion liquid of 2% PTFE was sprayed onto the coated layer and it was heated for 2 minutes at 240° C.

Manufacture of Microstructure Support Whiskers that Support Pt Alloy Catalyst

A prism shaped surface texture with distance between peaks of about 10 micrometers and depth of the peaks 6-7 micrometers was formed on a polyimide base member, in accordance with the method disclosed at page 35, line 11 to page 39, line 20 of PCT Pat. Pub. No. WO 01/11704, published Feb. 15, 2001. The microstructure support whiskers were formed on the side of the base member on which the surface texture was formed, by thermal sublimation (N,N'-di(3,5-xylyl)perylene-3,4:9,10-bis(dicarboxyimide)), an organic dye (obtained under the trade designation "C. I. PIGMENT RED 149" from American Hoechst Corp., Somerset, N.J.) and vacuum annealing. The method of manufacturing this organic microstructure support whiskers layer is disclosed in Materials Science and Engineering, A158 (1992), pp. 1-6; and J. Vac. Sci. Technol. A, 5(4), July/August, 1987, pp. 1914-16, the disclosures of which are incorporated herein by reference. Several of the microstructure support whiskers obtained were oriented in the direction normal to the surface of the base member, and the dimensions thereof were a cross-sectional diameter of about 30 to 50 nm and a length of about 1-2 micrometer. The numerical density of the microstructured support whiskers in the base member was adjusted to be about 30 whiskers/micrometer$^2$. Next, the base member was placed on a drum, and rotated below a magnetron sputtering source, to deposit the Pt alloy on the surface of the microstructure support whiskers, as disclosed in U.S. Pat. No. 5,338,430 (Parsonage et al.), U.S. Pat. No. 5,879,827 (Debe et al.), U.S. Pat. No. 5,879,828 (Debe et al.), U.S. Pat. No. 6,040,077 (Debe et al.), and U.S. Pat. No. 6,319,293 (Debe et al.), as well as U.S. Pat. Appl. Pub. No. 2002/0004453 (Haugen et al.). The composition of the catalyst particles covering the surface of the microstructured support whiskers was Pt 91.5 mass %, Co 8.4 mass %, and Mn 0.1 mass %.

Manufacture of Polymer Electrolyte Membrane (PEM)

An aqueous dispersion liquid of polytetrafluoroethylene perfluorosulfonate, an ion conductive polymer having equivalent quantity of sulfonate 800 (obtained under the trade "DYNEON" from 3M Company, St. Paul, Minn.) of solids content 40% by weight was applied to the polyimide base member (50 micrometer thickness) using a die coater, and annealed for 3 minutes at 200° C. The thickness of the PEM was adjusted to 20 micrometer.

Manufacture of the Catalyst Coated Membrane (CCM)

From the above polyimide base material having the microstructured support whiskers that support the Pt alloy catalyst on the surface, catalyst base material with dimensions 7.07 cm×7.07 cm, area 50 cm² were cut for the anode and the cathode. The anode catalyst base member was disposed on one side of the above PEM so that the microstructure support whiskers that support the Pt alloy catalyst contacted the PEM, then the cathode catalyst base member was disposed on the opposite side of the PEM, the stack obtained was passed through a laminator, heated and pressurized, and then the polyimide base member of the catalyst base members were removed.

Manufacture of a Working Example of a Single Cell Polymer Electrolyte Fuel Cell (PEFC)

The above CCM was sandwiched between a pair of N-GDL and a pair of gaskets that enclosed the rims of the N-GDL, and disposed between two inflexible plates referred to as partition plates. Here, the carbon layer of the N-GDL was in contact with the CCM, and N-GDL were disposed on both sides of the CCM. The CCM and the N-GDL according to this disclosure corresponds to the membrane electrode assembly (MEA). The partition plates were electrically conductive, and included fluid paths for distributing reaction substances or generated fluids. The effective electrode area of the resulting single cell polymer electrolyte fuel cell (PEFC) was about 50 cm².

COMPARATIVE EXAMPLE

Except from using the GDL in place of the N-GDL, a single cell PEFC was manufactured in the same manner as that of the Working Example.

Fuel Cell Performance Evaluation

1. Conditioning

For all the single cell PEFCs, conditioning was carried out using a process referred to as "thermal cycling" that included two stages, "operation" and "cooling". In the operation stage, the single cell PEFCs were operated for 40 minutes at a cell temperature of 75° C., anode and cathode dew point of 70° C., pressure of the reaction substances at atmospheric pressure, and $H_2$/air flow rates 800/1800 standard cc per minute ("SCCM"). Every five minutes during operation, the single cell PEFCs were swept from 0.85 V to 0.25 V, and then back to 0.85 V, in 0.05 V steps and 10 second intervals. During the sweep, the voltage of the single cell PEFCs was maintained at 0.40 V. In the cooling stage, the single cell PEFCs were cooled to room temperature (25° C.) over 40 minutes. This thermal cycling was repeated 16 times, after which the conditioning was completed.

Next, the Pt electrochemical surface area (ECSA) of the cathode of the single PEFCs was measured in the "initial state" immediately after conditioning, by cyclic voltammetry (CV). During measurement, the cell temperature was maintained at 80° C., the dew point at 80° C., the $H_2/N_2$ flow rate at 696/1657 SCCM and the cell outlet pressure at atmospheric pressure (the cell inlet pressure was about 1 per square cm at gauge ("pscg") (1 pscg on the anode side and about 3 pscg on the cathode side). For the standard hydrogen electrode (RHE), CV was measured 50 times over the range of voltage 0.09 to 0.65 V with a scan speed of 100 mV/second.

Subsequently, scans were carried out three times slowly at the scan speed of 2 mV/second, in order to evaluate short circuiting, hydrogen cross-over, and hydrogen generated current. For Pt surface area (8.0 m²/m²), electron short circuit resistance (2500 ohm-cm²), and hydrogen crossover current (1.1 mA/cm²), using special specification software, the Pt absorbed charge per unit active surface area was obtained as 220 μC/cm²-Pt, from CV.

2. Performance Reduction Evaluation

The performance reduction of the single cell PEFCs was evaluated by the following baseline procedure. The typical procedure included operating the single cell PEFCs continuously at cell temperature 80° C., dew point 80° C., $H_2$/air flow rate 696/1657 SCCM, and cell outlet pressure at atmospheric pressure, and the polarization curve was continuously scanned over the range from the open circuit voltage to 0.40 V, in 0.05 A/cm² steps and 20 second intervals. Measurement of the high frequency resistance (HFR) was carried out at the same time as scanning the polarization curve. The single cell PEFCs were operated for 20 hours in this way. Drying the MEA can cause resistance loss, so the opportunities for the MEA to dry were kept to a minimum by using fully saturated conditions. Also, in order to minimize the possibility of performance losses caused by absorbance of voltage dependent material that produces OH— at high voltages, the polarization curve scan was carried out, not at a fixed voltage, but with a periodically varying voltage. During the tests, in order for the relative humidity within the cells to reach a predetermined value, deionized water or deionized water that included various contaminants at the concentration of several micromoles was fed to a vaporization device at the cell inlet using a liquid feed pump for high performance liquid chromatography (HPLC) as a source of humidity. The single cell PEFCs that were operated using contaminated deionized water were initially operated for one hour with deionized water, in order to record the performance in the initial uncontaminated state. In the tests using contaminated deionized water, the contaminated dionized water was supplied to both electrodes, so the effect of diffusion of the contamination substances through the MEA was excluded. The current density values were obtained at specific cell voltages by linearly interpolating each of the polarization curves. These current density values were plotted as a function of time, and the curves obtained were fitted using linear regression. In several cases, the current density varied in a linear manner throughout the whole test period. In several other tests, after 10 hour more passed, a significant increase or decrease in the rate of reduction of the current density was observed and then plateaued, so linear regression fitting was carried out for the initial period of operation when the performance varied virtually linearly with time.

Unless stated otherwise, the performance reduction ratio was calculated based on the current density at 0.70 V. There were two reasons for selecting the performance reduction ratio for the current density at 0.70 V: (1) because in these tests both rate-dependent losses caused by reversible performance reduction and mass transfer losses are represented, and (2) because the value of performance reduction ratio for the current density at 0.70 V is generally the largest value compared with other possible cell voltages.

3. Verification of Arrested Chloride Ion

The test cells that were operated in a flow of reaction substances that included chloride ion were dismantled after completion of operation of the fuel cells, and the N-GDL of both the anode and the cathode were removed. Next, these N-GDL were placed in beakers, and immersed in 50 mL aqueous solution of 0.01 mol/L NaOH. After removing the N-GDL from the beakers, the aqueous solution of NaOH was analyzed by ion chromatography (IC).

4. Regeneration of the MEA 720 mL of aqueous 0.1 mmol/L NaOH solution was injected into the test cells that had been operated under a reaction substance flow that included chloride ion, at the rate 3 mL/minute, then deionized water was injected at the same rate for 10 minutes. The aqueous NaOH solution discharged from the test cells was analyzed by Integrated Circuit ("IC"). A test cell including the N-GDL that was regenerated by the above procedure was operated for five hours in accordance with the conditioning procedure, and then the polarization curve was measured again.

Results

Figure 2:
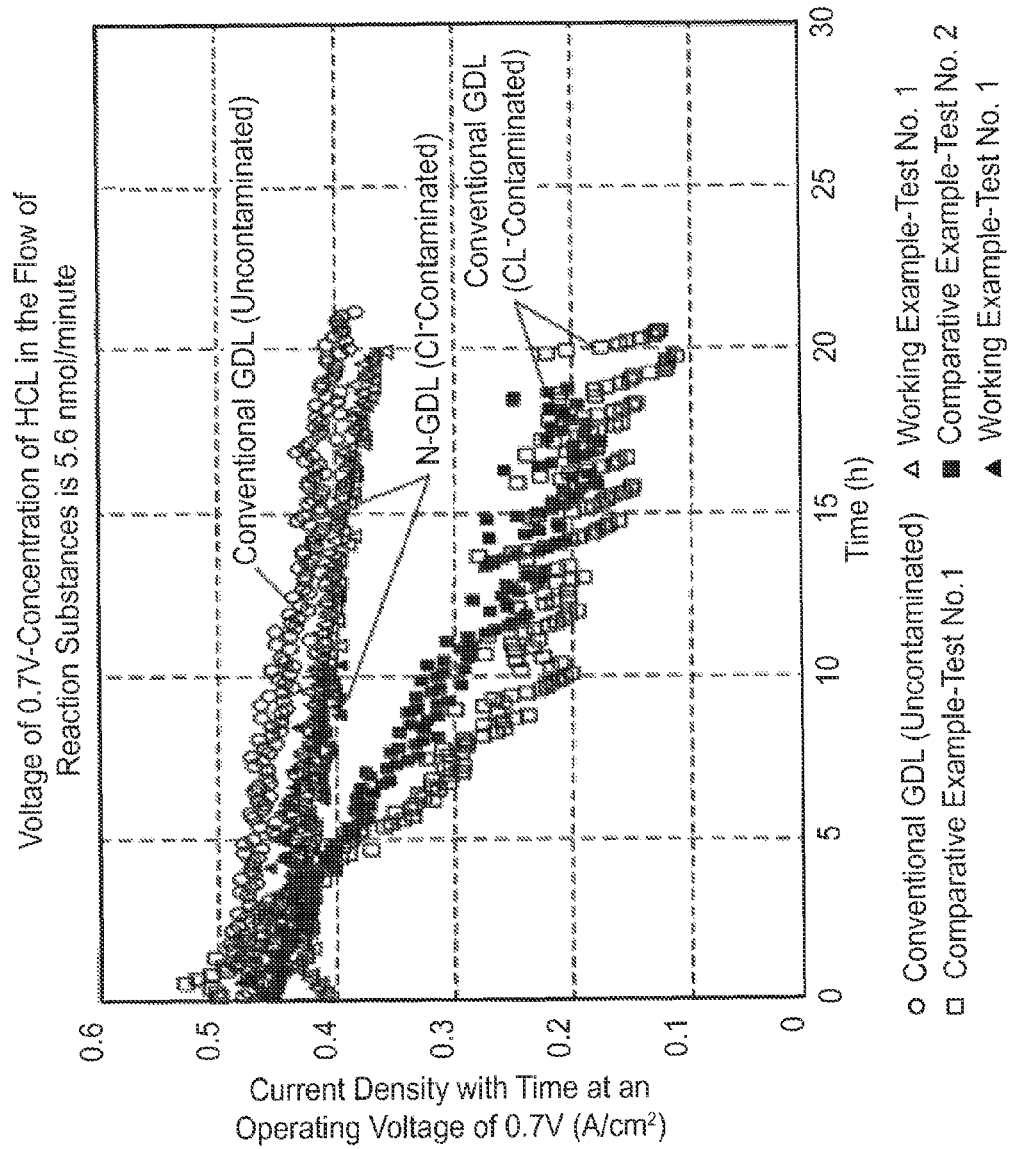
FIG. 2 shows the variation of current density with time at an operating voltage of 0.7 V, when the concentration of HCl in the flow of reaction substances is 5.6 nmol/minute.
Figure 3:
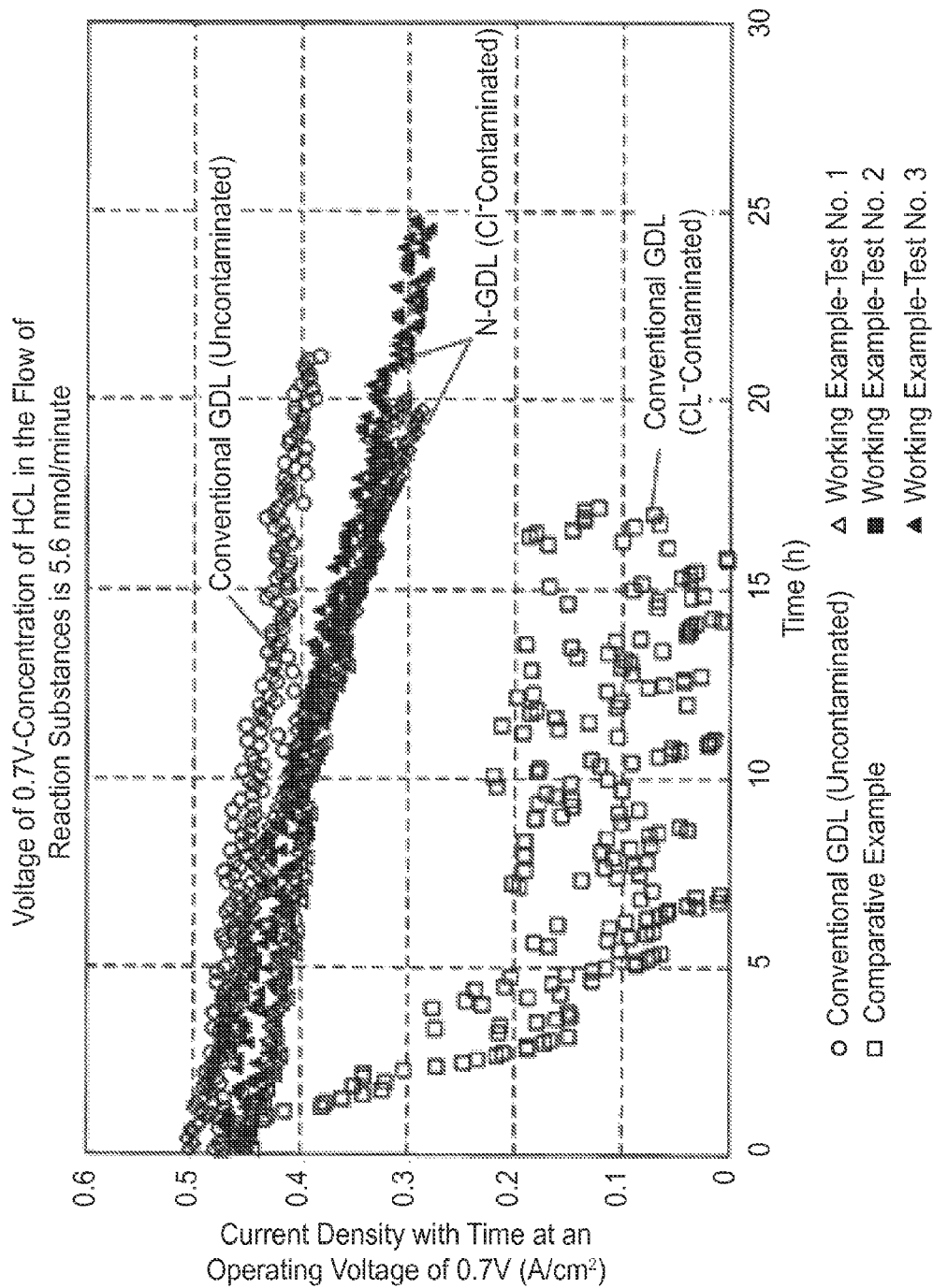
FIG. 3 shows the variation of current density with time at an operating voltage of 0.7 V, when the concentration of HCl in the flow of reaction substances is 16.8 nmol/minute.

FIGS. 2 and 3 show the variation of current density at 0.7 V with time during operation using a reaction substances flow that was contaminated with hydrochloric acid. FIG. 2 shows the variation of current density when the test cells were operated using a reaction substances flow contaminated with HCl at 5.6 nmol/minute. FIG. 3 shows the variation of current density when the test cells were operated using a reaction substances flow contaminated with HCl at 16.8 nmol/minute.

Figure 4:
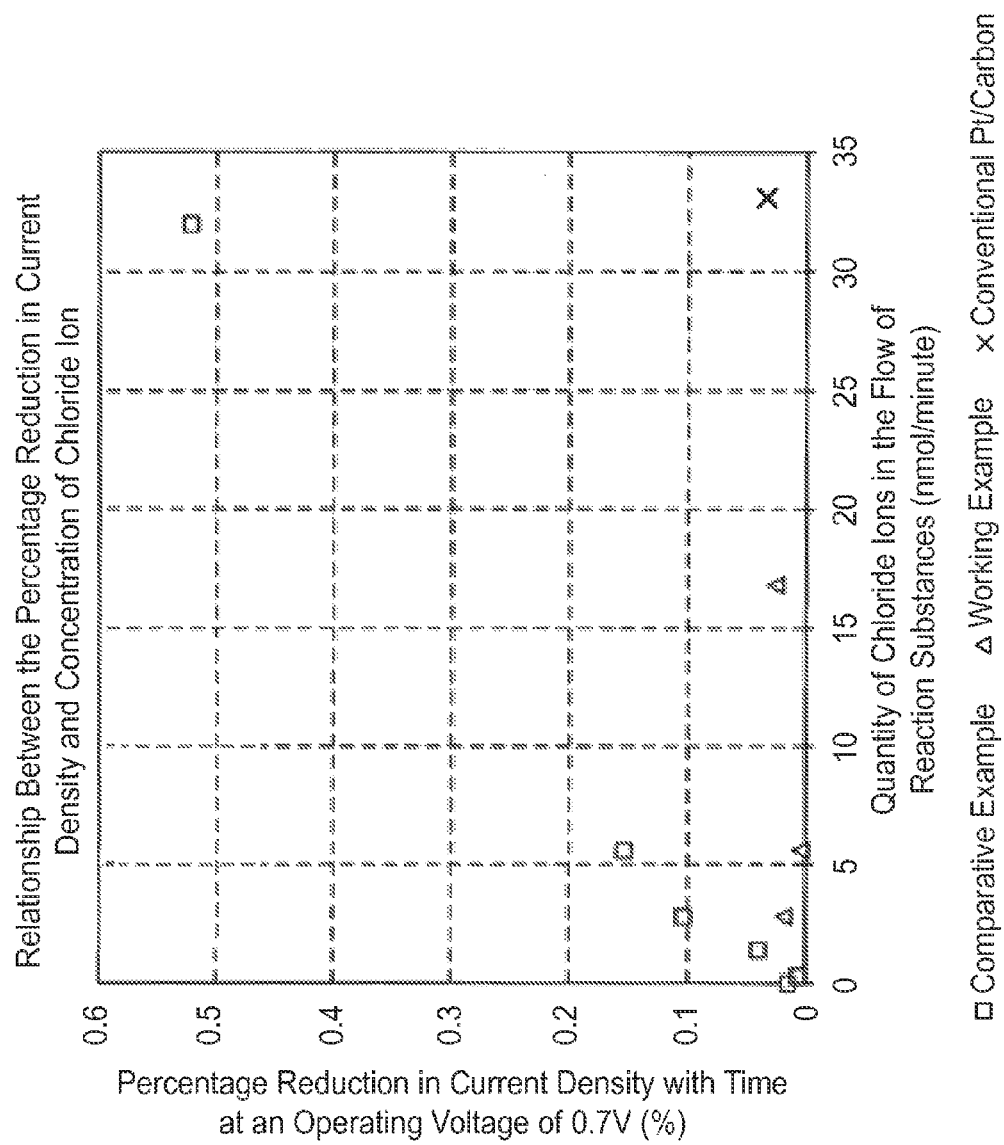
FIG. 4 shows the relationship between the percentage reduction in current density and concentration of chloride ion.

FIG. 4 shows the performance reduction ratio for the Working Example and the Comparative Example for various concentrations of chloride ion. The performance reduction ratio obtained using an MEA including a conventional Pt coated carbon catalyst and a conventional GDL is also shown. The quantity of Pt in the electrode catalytic layer of both the Working Example and the Comparative Example was 0.10 mg/cm$^2$, and the quantity of Pt in the electrode catalytic layer using the conventional Pt coated carbon catalyst was 0.2 mg/cm$^2$.

Figure 5:
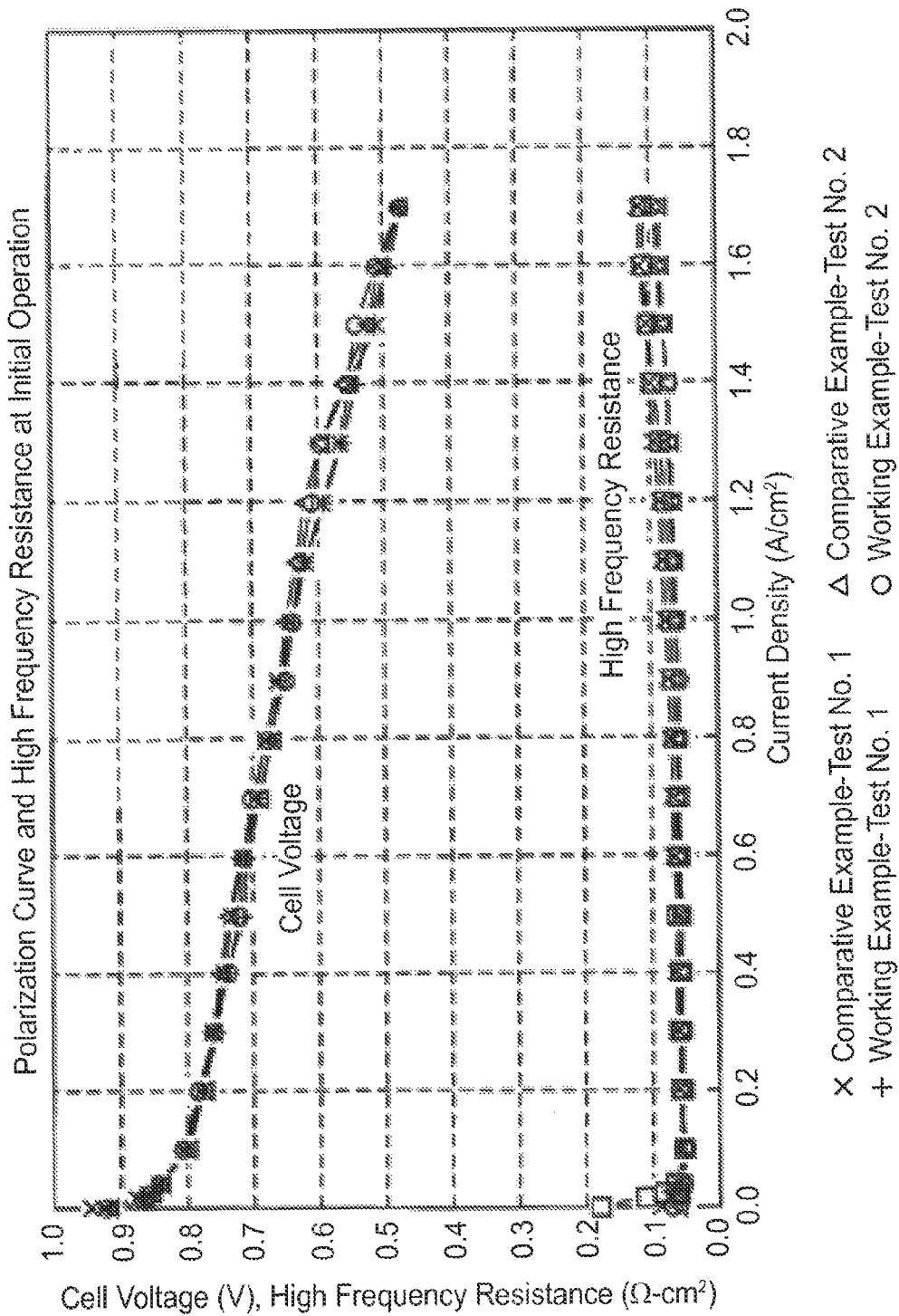
FIG. 5 shows the polarization curve and high frequency resistance at initial operation.

FIG. 5 shows the initial polarization curve and high frequency resistance for both the Working Example and the Comparative Example.

Figure 6:
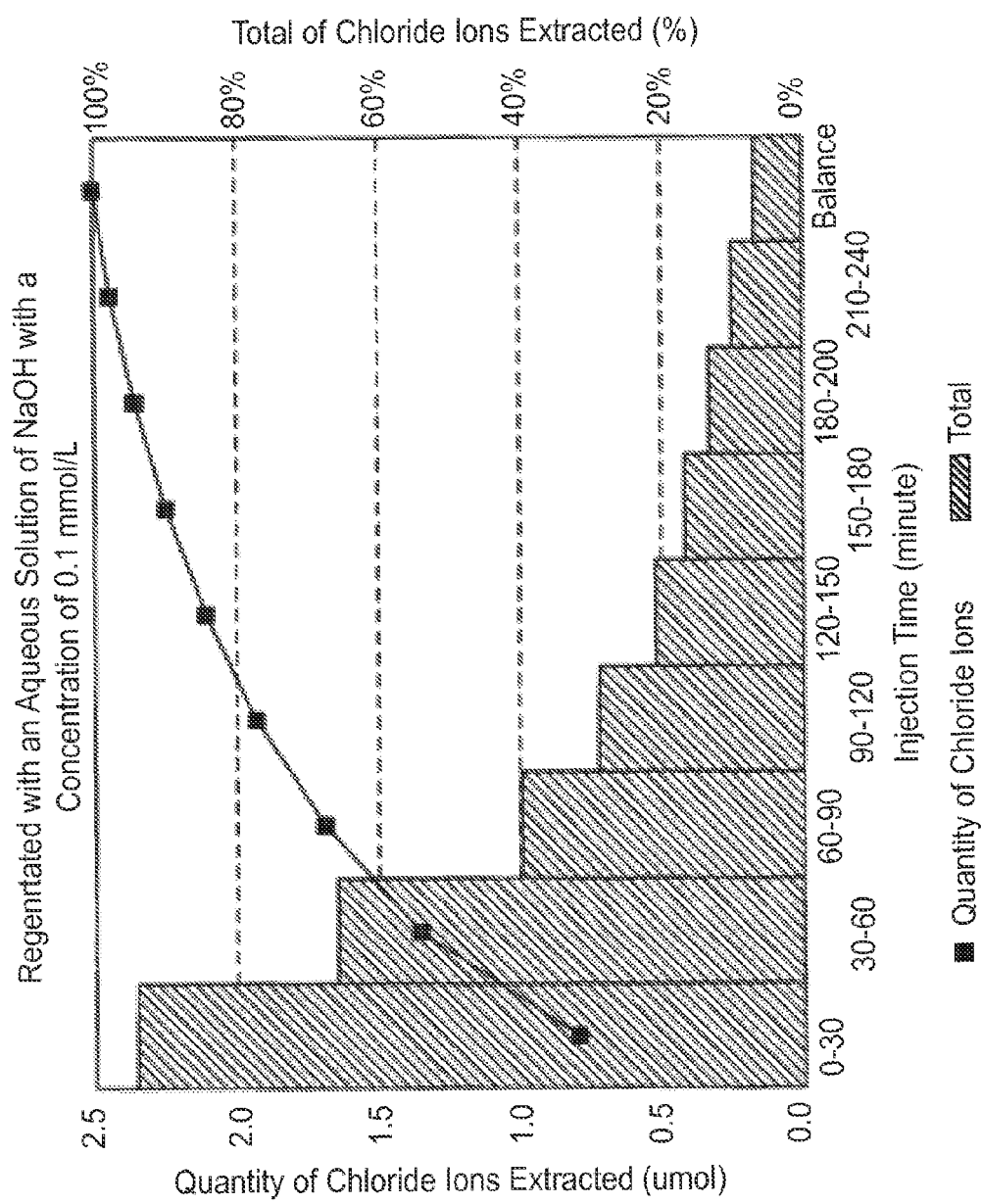
FIG. 6 shows the quantity of chloride ions extracted and the total thereof when a membrane electrode assembly was regenerated with an aqueous solution of NaOH with a concentration of 0.1 mmol/L.

FIG. 6 shows the quantity of chloride ion recovered by in-situ regeneration by injecting an aqueous solution of 0.1 mmol/L NaOH. By supplying the aqueous NaOH solution for 4 hours at 3.0 mL/minute, 97% of the chloride ion trapped on the N-GDL was recovered.

Figure 7:
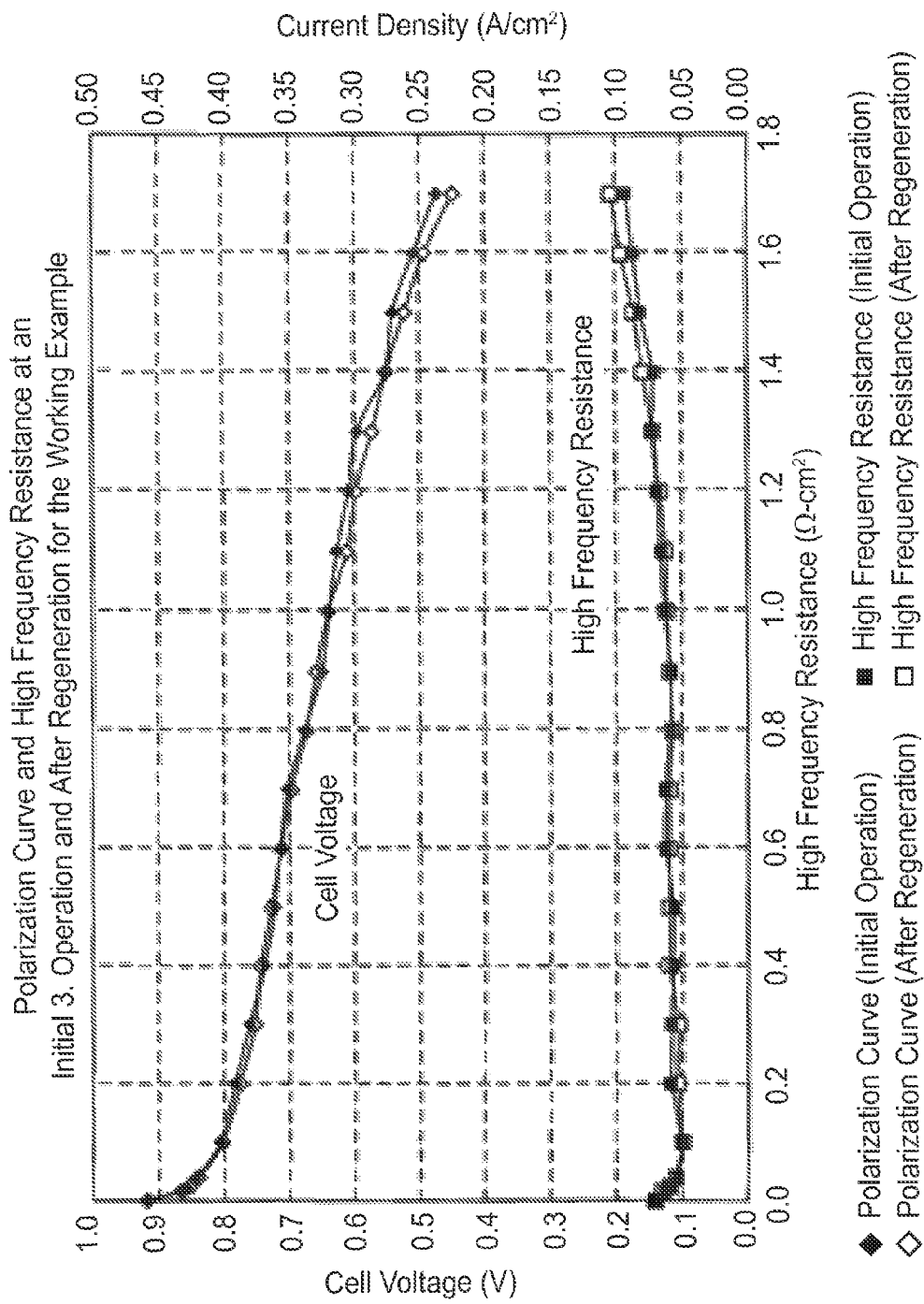
FIG. 7 shows the polarization curve and high frequency resistance at initial operation and after regeneration for a fuel cell according to the Working Example.

FIG. 7 shows the polarization curve and high frequency resistance at initial operation and after regeneration for the Working Example.

What is claimed is:

1. A membrane electrode assembly comprising:
   an electrolyte membrane;
   an electrode catalytic layer comprising acicular microstructured support whiskers having a dimension in at least one direction equal to or smaller than about a micrometer, wherein the acicular microstructed support whiskers bear acicular nanoscopic catalyst particles wherein the acicular nanoscopic catalyst particles have a dimension in at least one direction of not more than about 15 nm or a crystallite size of not more than about 15 nm as measured from diffraction peak half widths of standard 2-theta x-ray diffraction scans; and
   a gas diffusion layer comprising a nitrogen-containing compound having an anionic ion-exchange group.

2. The membrane electrode assembly according to claim 1, wherein the nitrogen-containing compound is crosslinked, thereby being immobilized to the gas diffusion layer.

3. The membrane electrode assembly according to claim 1, wherein the nitrogen-containing compound is selected from the group consisting of nitrogen-containing alkoxysilane, a hydrolyzed condensate thereof, and a mixture thereof.

4. The membrane electrode assembly according to claim 1, wherein the acicular microstructured support whiskers have a mean diameter of a whisker cross-section of no greater than 100 nm, and a mean aspect ratio of at least 3.

5. The membrane electrode assembly according to claim 1, wherein the anionic ion exchange group is capable of arresting chloride ions by electrical interaction.

6. The membrane electrode assembly according to claim 1, wherein the nitrogen-containing compound having at least one anionic exchange group is selected from the group consisting of an amino group, an amide group, and an ammonium group.

7. The membrane electrode assembly according to claim 1, wherein the gas diffusion layer further comprises a water repellant finish.

8. The membrane electrode assembly according to claim 1, wherein the electrolyte membrane comprises an anionic functional group.

9. The membrane electrode assembly according to claim 1, wherein the gas diffusion layer further comprises a water repellant finish.

10. A gas diffusion layer comprising (a) a layer comprising a nitrogen-containing compound having an anionic ion-exchange group therebetween, wherein the nitrogen-containing compound is crosslinked, thereby being immobilized to the gas diffusion layer; and (b) a water repellant finish disposed on top of said layer.

11. The gas diffusion layer according to claim 10, wherein the nitrogen-containing compound is selected from the group consisting of nitrogen-containing alkoxysilane, a hydrolyzed condensate thereof, and a mixture thereof.

12. The gas diffusion layer according to claim 10, wherein the gas diffusion layer comprises a mesh, or a porous web.

13. The gas diffusion layer according to claim 10, wherein the gas diffusion layer comprises a carbon paper.

14. The gas diffusion layer according to claim 10, wherein the gas diffusion layer is free of particles of a metal catalyst.

15. A method of regenerating a membrane electrode assembly, the membrane electrode assembly comprising:
    an electrolyte membrane;
    an electrode catalytic layer comprising acicular microstructured support whiskers having a dimension in at least one direction equal to or smaller than about a micrometer, wherein the acicular microstructured support whiskers bear acicular nanoscopic catalyst particles wherein the acicular nanoscopic catalyst particles have a dimension in at least one direction of not more than about 15 nm or a crystallite size of not more than about 15 nm as measured from diffraction peak half widths of standard 2-theta x-ray diffraction scans; and
    a gas diffusion layer comprising a nitrogen-containing compound having an anionic ion-exchange group;
    the method comprising contacting the gas diffusion layer with an alkaline solution.

* * * * *